(No Model.) 4 Sheets—Sheet 2.
N. W. PERRY.
SYSTEM OF ELECTRIC DISTRIBUTION FOR RAILWAYS.
No. 466,367. Patented Jan. 5, 1892.
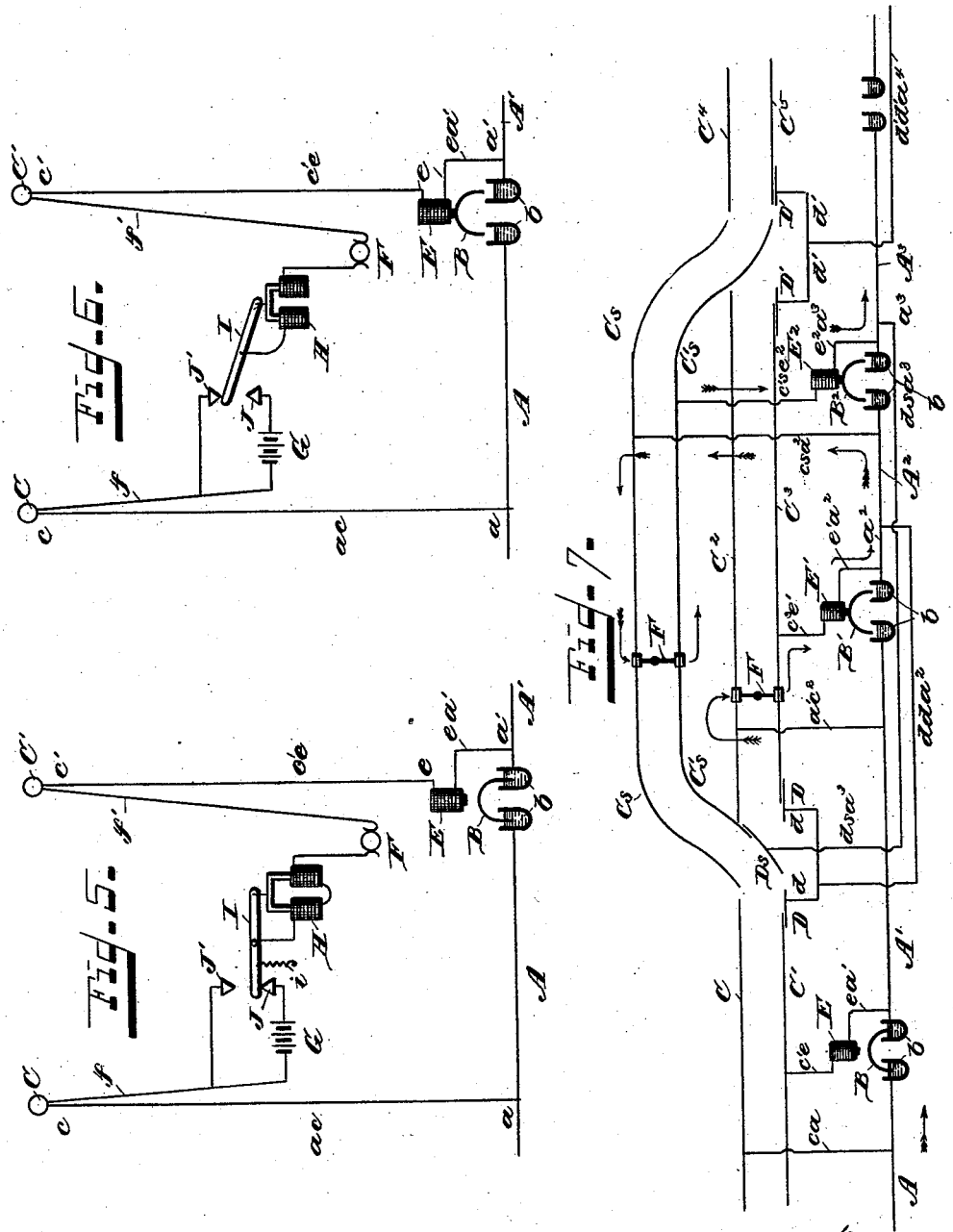
Witnesses.
Inventor.
Nelson W. Perry,
per Parkinson & Parkinson,
His Attorneys.

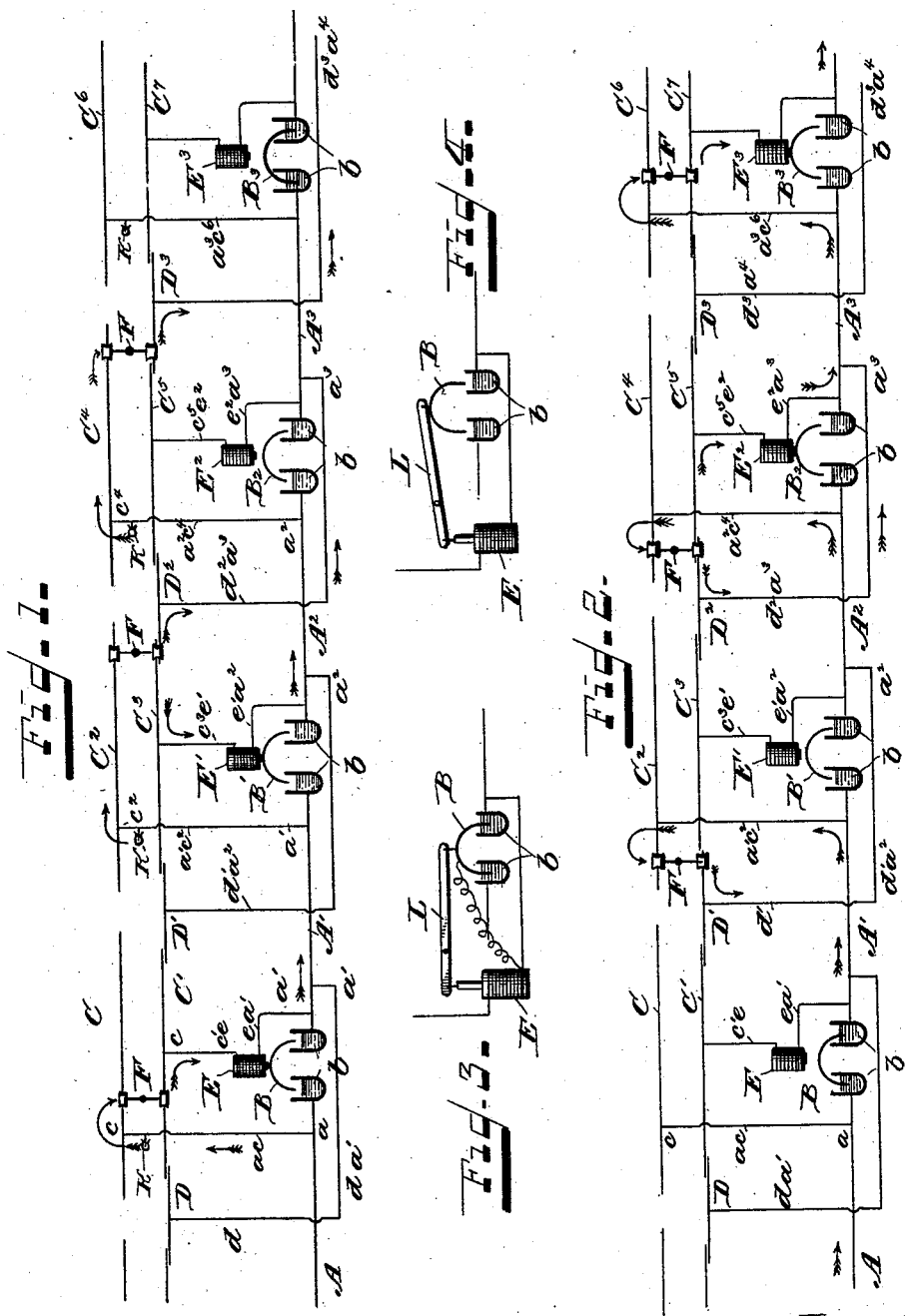

(No Model.) 4 Sheets—Sheet 3.
N. W. PERRY.
SYSTEM OF ELECTRIC DISTRIBUTION FOR RAILWAYS.
No. 466,367. Patented Jan. 5, 1892.
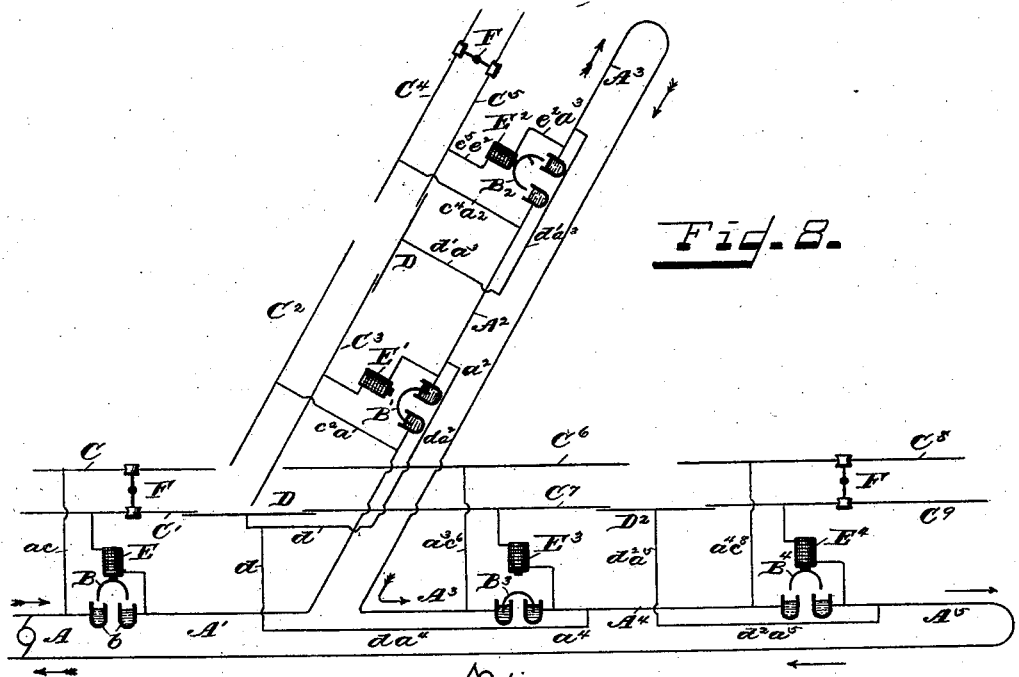
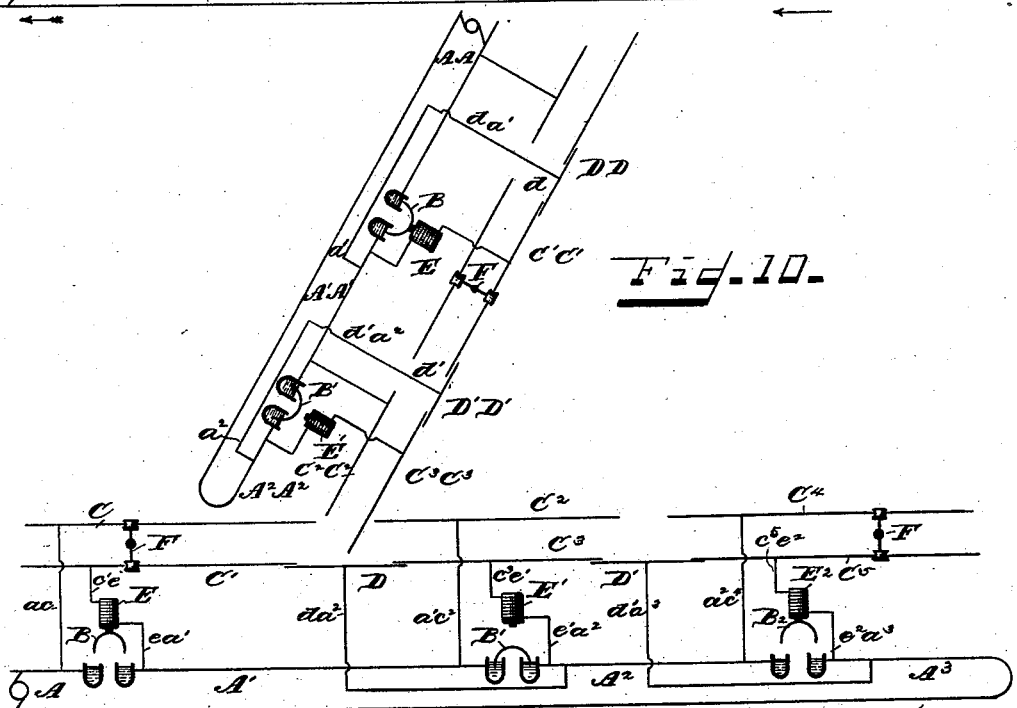

(No Model.) 4 Sheets—Sheet 4.
N. W. PERRY.
SYSTEM OF ELECTRIC DISTRIBUTION FOR RAILWAYS.
No. 466,367. Patented Jan. 5, 1892.
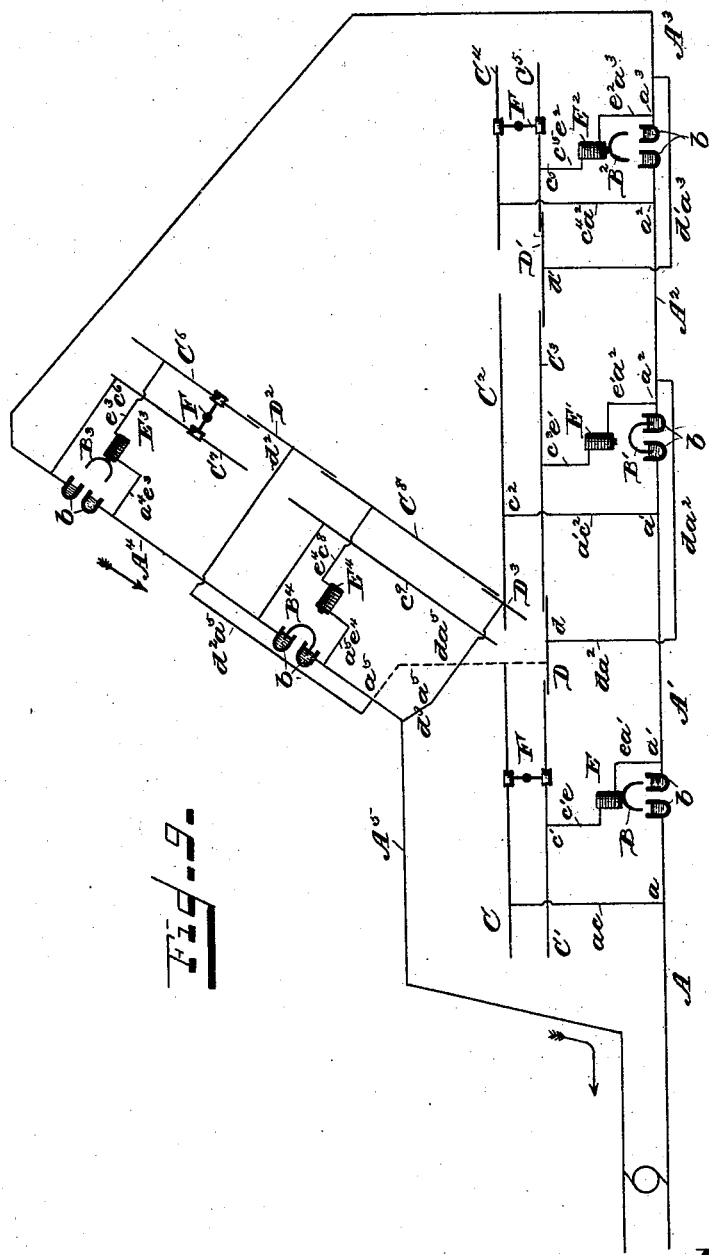

UNITED STATES PATENT OFFICE.

NELSON W. PERRY, OF CINCINNATI, OHIO.

SYSTEM OF ELECTRIC DISTRIBUTION FOR RAILWAYS.

SPECIFICATION forming part of Letters Patent No. 466,367, dated January 5, 1892.

Application filed March 2, 1891. Serial No. 383,350. (No model.)

*To all whom it may concern:*

Be it known that I, NELSON W. PERRY, a citizen of the United States, residing in Cincinnati, in the county of Hamilton and State of Ohio, have invented certain new and useful Improvements in Systems of Electric Distribution, of which the following is a specification.

My invention relates to the distribution of electricity by a current which remains constant in quantity, while the translating devices are arranged in series with one another and with the generator or dynamo, and it includes a current-conveyer made in sections, each section being normally connected electrically with its neighboring section; parallel sectional working conductors, each section of which is electrically insulated from the adjacent sections; means for diverting the normal current from the normal circuit in such manner that it will pass through the translating device and return to the normal circuit; devices by which the changes in the path of the current may be effected without interrupting its continuity, and provisions for siding and branch lines.

The invention consists in the system of distribution hereinafter set forth and in the various circuits and instrumentalities employed in the practical application of the same.

I have illustrated the system as applied to an electric railway.

In the drawings, Figure 1 is a diagrammatic view representing several sections of the normal circuit and of the working conductors and showing the translating device or motor in three positions relatively to the switch, the course of the current in the several positions being indicated by arrows and the motor being represented as traveling from left to right, or in the same direction as the main current. Fig. 2 is a corresponding view representing the motor as traveling from right to left, or in a direction opposite to that of the main current. Figs. 3 and 4 show the switch closed and open. Figs. 5 and 6 show a battery carried by the car and its connections. Fig. 7 is a diagrammatic view showing a single-track road provided with a siding. Fig. 8 shows a branch road connected by the loop system. Fig. 9 shows a branch road provided with current from the return-wire of the main circuit. Fig. 10 shows a branch designed to be operated by separate dynamos.

A A' A², &c., represent sections of the main current-conveyer or normal circuit. Each of these sections has at its ends mercury-cups $b$, separated by a space from the cups at the ends of the adjacent sections. Into each pair of adjacent cups normally take U-shaped double pole-contacts B B' B², &c., which bridge the gaps between the sections and render them electrically continuous.

C C² C⁴, &c., represent sections of one line of working conductors, and C' C³ C⁵, &c., sections of another line. These sections are electrically discontinuous, but may be made mechanically continuous by bridging the gaps with insulating material.

D D' D², &c., represent electric conductors overlapping the ends of the sections C' C³, &c., and hereinafter called "supplemental" conductors.

E E' E², &c., are solenoid-magnets whose armatures are adapted to actuate levers L, with which the forks B B', &c., are connected.

The section A of the main circuit is electrically connected with the working conductor C by means of a wire $a\ c$, the section A' with C² by means of a wire $a'\ c²$, &c.

The section A' of the main circuit is electrically connected with the working conductor C' through wire $e\ a'$, solenoid-magnet E, and wire $c'\ e$, the section A² with working conductor C³ through wire $e'\ a²$, solenoid-magnet E', and wire $c³\ e'$.

The sections A' A² A³, &c., are connected with the supplemental conductors D D' D², &c., by wires $d\ a'\ d'\ a²\ d²\ a³$, &c.

F is a motor provided with trolleys $f$ and $f'$ or other current-gathering devices adapted to contact with the working conductors.

If with the electrical connections made as above described and the normal circuit closed a motor comes onto a section of the working conductor C C', for instance, a subsidiary or derived circuit will be formed through the wire $a\ c$, working conductor C, motor F, working conductor C', wire $c'\ e$, magnet E, and wire $e\ a'$. The current through this derived circuit will energize the magnet; but the resistance may be too great to allow sufficient current to pass to actuate the armature of magnet E and lift the fork B. The motor will then be in multiple and the current will not be sufficient to actuate it. It is desired to place the motor in series, and this can be accomplished by raising the fork B. To insure this a battery G is placed upon the car. (See Figs. 5 and 6.) In circuit with battery G is a solenoid-magnet H, whose armature is connected with one end of a lever I, the other end of which normally engages with contact J. This contact may be insured by means of an adjustable spring $i$. This battery-current will pass via contact J, lever I, magnet H, motor F, trolley $f'$, working conductor $C'$, wire $c'\,e$, magnet E, wire $e\,a'$, the normal circuit, wire $a\,c$, working conductor C, and back to battery via trolley $f$, or in the reverse direction. The current thus formed will be sufficiently strong to actuate the solenoid-magnet E, which will lift the fork B, thereby breaking the direct connection between main-circuit sections A and $A'$ and sending the main current through the motor F. The course of the main current will then be through section A, wire $a\,c$, working conductor C, trolley $f$, battery G, contact J, lever I, magnet H, motor F, trolley $f'$, working conductor $C'$, wire $c'\,e$, magnet E, and wire $e\,a'$ to section $A'$. The same current which actuates the solenoid-magnet E will tend to actuate the magnet H. It is essential that the lever I shall not be withdrawn from the contact J before the fork B is withdrawn from the mercury-cups $b$. This may be guarded against by making the lever I of comparatively large inertia. When the switch B has been opened and the main current is switched through solenoid-magnet H, it will actuate the lever I, throwing it into contact at $J'$, and the course of the main current will then be through section A, wire $a\,c$, working conductor C, trolley $f$, contact $J'$, lever I, magnet H, motor F, trolley $f'$, working conductor $C'$, wire $c'\,e$, magnet E, wire $e\,a'$, and section $A'$. As the trolley-wheels pass off from the section C $C'$ electrical connection between the wires C and $C'$ is broken, the armature is released, and the fork B drops back into the mercury-cups, thus making direct electrical connection between the section A and $A'$ through the mercury-cups and the fork B. The circuit through magnet H being broken, the lever I falls back into contact with J, bringing the switch on the car into its normal position, so that the battery is free to act as soon as the trolley-wheels reach the succeeding section. The momentum of the moving car carries it over the intervening space, which may be very short. The car, being in motion, will by its momentum drive the armature of its motor, thus converting it for the time into a dynamo. As soon as the trolley-wheels reach a new section a circuit is completed, as before, the battery acts and is assisted in moving the switches by the current generated by the motor, the fork $B'$ is raised, the battery G is cut out of circuit, and the motor is again in series with the adjacent sections of the normal circuit.

With the connections thus far described, when a car passes from one section to another, the circuit will be momentarily broken while the switch is closing, thus causing a spark at the trolley-wheels. To avoid the irregularity of current and the spark thus caused, I provide supplemental conductors D $D'$ $D^2$, which lap over the adjacent sections of $C'$ $C^3$ $C^5$, &c., but are insulated therefrom. The sections $C'$ $C^3$ $C^5$ of the working conductors are made shorter than the sections C $C^2$ $C^4$. When the trolley reaches the overlapping portion of the supplemental conductor $D'$, two paths will be open for the current, one through the solenoid-magnet E, as before, and one through the connection $d'\,a^2$. As soon as the wheel passes the lap the current through E is broken and the switch is closed; but during the time occupied in this closing the current finds its way around the switch to the main circuit through the connection $d'\,a^2$. When the car is going in the direction of the current, the supplemental conductors may be connected with that section of the normal circuit next beyond the switch controlling the section from which the car reaches the lap and the supplemental conductors may lap the sections of the working conductor at but one end. This arrangement would afford no supplemental path when the car is traveling in a direction opposite to that of the current. The supplemental path should short-circuit the switch which controls the section the car is leaving. For a car traveling with the current it is immaterial whether the supplemental path short-circuits one switch or more. By making it short-circuit the switch controlling the section the car is leaving and the switch controlling the succeeding section and lapping the supplemental conductors over the ends of the two adjacent sections of one line of working conductors a supplemental path is provided for cars traveling in either direction.

In Fig. 1 of the drawings I have shown the positions of the switches and the course of the current with the car in several positions while going from left to right. The course of the current with the motor making electrical connection between corresponding sections of the working conductors, as upon section C $C'$, Fig. 1, has already been described. Upon section $C^2$ $C^3$ one trolley is represented as upon working conductor $C^2$, while the other embraces both $C^3$ and the supplemental conductor $D^2$. The current after passing through the motor divides, part following its former path through $C^3$, wire $c^3\,e'$, solenoid $E'$, and wire $e'\,a^2$ to normal-circuit section $A^2$ and part passing through supplemental conductor $D^2$ and wire $d^2\,a^3$ to section $A^3$. Upon section $C^4$ $C^5$ one trolley is represented as in contact with $C^4$, while the other trolley has just passed from $C^5$ and is in contact with $D^3$ only.

The path of the current is via $C^4$, the motor $D^3$, and wire $d^3$ $a^4$ to $A^4$. There being no current through solenoid $E^2$, the fork $B^2$ will drop and the current resume its normal path. Fig. 2 shows the position of the switches and the course of the current as the car travels from right to left. In the latter case, while the trolleys are in contact with sections of the working conductors $C^6$ and $C^7$, for instance, the course of the current is the same as shown in section C C' of Fig. 1. When the trolley comes in contact with one of the supplemental conductors $D^2$, for instance, two paths will be open for the current, one through solenoid-magnet $E^2$ to $A^3$ and one through $D^2$ and wire $d^2$ $a^3$ to $A^3$. When the trolley passes off the conductor $C^5$, the current through the magnet $E^2$ is broken, and while the other trolley is in contact with $C^4$ the fork $B^2$ drops into the mercury-cups and the normal circuit is again closed.

In the connection $a\ c$ I prefer to place a lamp or other device K, which may serve as a signal and which is adapted to be operated by an electric current. As there is no electric current through the wire $a\ c$, except when there is a motor upon that section, the lamp will be lighted when a car comes upon that section and will go out when the car passes from the section, thus affording a simple automatically-actuated signal, which indicates whether there is a car upon the section.

Fig. 7 illustrates the connections for a siding upon a single-track road, the drawing being made upon the assumption that the outgoing car keeps the main track. C s and C' s represent the working conductors for the switch. D D and D' are the supplemetal conductors for the main track, which are made two part, and D s is an additional supplemental conductor for the siding. The normal-circuit section $A^2$ is connected with the two-part supplemental conductor D D by a wire $d\ d\ a^2$. In this arrangement the siding is operated by the switch $B^2$, and the alternate path for the car on the siding must therefore short-circuit that switch. Consequently the supplemental conductor D s is connected with normal-circuit section $A^3$ by a wire $d\ s\ a^3$ and the two-part wire D' D' with $A^4$ by a wire $d'$ $d'$ $a^4$. The operation will be readily understood from the diagram and the previous description.

Fig. 8 shows an arrangement of electrical connections for a branch road on the loop system. A car going from C C' to $C^2$ $C^3$ or to $C^6$ $C^7$ must short-circuit the switch B, which is accomplished by means of the alternative path $d\ a^2$ or $d\ a^4$. A car going from $C^6$ $C^7$ to C C' must short-circuit switch $B^3$, which is accomplished by the wire $d\ a^4$. A car going from $C^2$ $C^3$ to C C' must short-circuit the switch B', which is accomplished by the alternative path $d\ a^2$.

Fig. 9 illustrates connections for providing current for a branch from the return-wire of the main circuit. A car going in either direction on the main line is provided for in the usual way, as is a car going from C C' to $C^8$ $C^9$. In going from $C^8$ $C^9$ to C C' the alternative path may be through $d^3$ $a^5$, or the section $C^8$ may be continued to overlap D and the alternative path be through D and the connection $d\ a^5$. (Shown in dotted line.)

Fig. 10 shows an arrangement for connecting roads operated by different dynamos. The operation will be understood from the diagram without further description.

It will be seen that the number of sections into which the main circuit and the working conductors or trolley-lines are divided need not exceed the maximum number of translating devices to be used upon the line.

Since the various sections are only brought into circuit by the motor, an accident which breaks that circuit—such as the burning out of a motor, a car leaving its track, or a trolley leaving its wire—automatically closes the normal circuit and there is no interruption of other cars on the circuit, as is the case where the working conductors are a permanent part of the circuit.

I claim as my invention—

1. The combination, in a system of electric distribution for movable translating devices, of a sectional current-conveyer, switches normally closing the gaps between the sections, two lines of sectional conductors, the corresponding sections of each line being connected with separate sections of the main current-conveyer, supplemental conductors lapping one line of conductors and insulated therefrom, and electrical connections between the supplemental wires and the main current-conveyer, substantially as and for the purpose specified.

2. The combination of a sectional current-conveyer, switches normally closing the gaps between the sections, magnets controlling the switches, two lines of sectional conductors, supplemental conductors lapping the ends of the sections of one line of conductors, movable translating devices, a connection between a section of the main current-conveyer and a section of one line of conductors, a connection from the corresponding section of the other line of conductors with the switch-controlling magnet, a connection from the magnet to a section of the main current-conveyer beyond that to which the corresponding section of the first line of conductors is connected, and a connection from the supplemental conductor to a section of the main conveyer beyond the switch which controls the section which the translating device is leaving when it reaches the supplemental conductor, substantially as and for the purpose specified.

3. The combination, in a system of electric distribution for movable translating devices, of the sectional current-conveyer A A', switches B B', normally closing the gaps between the sections, the sectional working conductors C $C^2$ and C' $C^3$, wire $a\ c$, connecting section A of the main conveyer with section C of the working conductor, the magnet E, adapted, when energized, to actuate the switch, wire $c'\ e$, connecting section C' of the working conductor with magnet E, the wire $e\ a'$, connecting magnet E with section A' of the main conveyer, the supplemental conductor D', and wire $d'\ a^2$, connecting supplemental conductor D' with main-conveyer section $A^2$, substantially as and for the purpose specified.

4. The combination, in a system of electric distribution for movable translating devices, of a sectional current-conveyer, switches normally closing the gaps between the sections, two lines of sectional conductors, the corresponding sections of each line being connected with separate sections of the main conveyer, the siding conductor-sections C s and C' s, each connected with a different section of the main conveyer, the supplemental conductor D D, a wire connecting D D with a section of the main conveyer and short-circuiting the switch controlling the succeeding section, the supplemental conductor D s, lapping siding-section C s, and a wire connecting supplemental conductor D s with a section of the main conveyer beyond the switch which controls the siding, substantially as and for the purpose specified.

5. The combination, in a system of electric distribution for movable translating devices, of a sectional conveyer A A', switches B B', normally closing the gaps between the sections, the sectional trolley-lines C $C^2$ and C' $C^3$, the magnet E, adapted to actuate the switches, wire $a\ c$, connecting section A of the main conveyer with trolley-section C, wire $c'\ e$, connecting trolley-section C' with magnet E, and wire $e\ a'$, connecting magnet E with section A' of the working conductor, substantially as and for the purpose specified.

6. The combination, in a system of electric distribution for movable translating devices, of the sectional current-conveyer A A', mercury-cups $b$ at the ends of each section thereof, forked arms B, normally taking into the adjacent mercury-cups, magnets E, adapted, when energized, to withdraw the forked arms from the mercury-cups, the sectional trolley-lines C $C^2$ and C' $C^3$, wire $a\ c$, connecting section A of the main conveyer with trolley-section C, wire $c'\ e$, connecting trolley-section C' with magnet E, and wire $e\ a'$, connecting magnet E with section A' of the working conductor, substantially as and for the purpose specified.

7. The combination, in a system of electric distribution for movable translating devices, of a sectional current-conveyer A A', switches B B', normally closing the gaps between the sections, magnets E E', controlling the switches, two lines of sectional conductors C $C^2$ and C' $C^3$, the corresponding sections of each line being connected with separate sections of the main conveyer, the battery G, the magnet H, the lever I, adapted to be actuated thereby, and a battery-circuit through magnet H and the main switch-controlling magnet, substantially as and for the purpose specified.

8. The combination, in a system of electric distribution for movable translating devices, of a sectional current-conveyer, switches normally closing the gaps between the sections, magnets controlling the switches, two lines of sectional conductors, subsidiary circuits from the main conveyer through the switch-controlling magnets, adapted to be closed as the terminals of a translating device contact with corresponding sections of the working conductors and become the path for the main current when a switch has been opened, and an electrically-actuated signal in the subsidiary circuit, substantially as and for the purpose specified.

9. The combination, in a system of electric distribution for movable translating devices, of a sectional current-conveyer A A', the switches B B', normally closing the gaps between the sections, the sectional working conductors C $C^2$ and C' $C^3$, the corresponding sections of each line being connected with separate sections of the main conveyer, and an electrically-actuated signal in one of the connections, substantially as and for the purpose specified.

NELSON W. PERRY.

Witnesses:
JAMES N. RAMSEY,
GEORGE B. PARKINSON.